(12) United States Patent
Howard et al.

(10) Patent No.: US 7,555,980 B2
(45) Date of Patent: *Jul. 7, 2009

(54) METHOD AND APPARATUS FOR DISPENSING A LIQUID BEVERAGE CONTAINING REAL MILK SOLIDS

(75) Inventors: Ronnie L. Howard, Springboro, OH (US); Frank D. Lauch, Hebron, KY (US)

(73) Assignee: Moo Technologies, LLC, Batavia, OH (US)

( * ) Notice: Subject to any disclaimer, the term of this patent is extended or adjusted under 35 U.S.C. 154(b) by 1226 days.

This patent is subject to a terminal disclaimer.

(21) Appl. No.: 10/790,643

(22) Filed: Mar. 1, 2004

(65) Prior Publication Data

US 2004/0170727 A1 Sep. 2, 2004

Related U.S. Application Data

(63) Continuation-in-part of application No. 10/254,118, filed on Sep. 25, 2002, now Pat. No. 6,887,505, which is a continuation-in-part of application No. 09/850,983, filed on May 8, 2001, now abandoned, which is a continuation of application No. 09/433,365, filed on Nov. 3, 1999, now abandoned.

(51) Int. Cl.
*A47J 37/12* (2006.01)
*A23L 1/00* (2006.01)
(52) U.S. Cl. ............................ 99/407; 426/510
(58) Field of Classification Search ............... 99/407, 99/324, 403, 404; 426/106, 510, 511
See application file for complete search history.

(56) References Cited

U.S. PATENT DOCUMENTS

| | | | |
|---|---|---|---|
| 2,473,493 A | 6/1949 | Otting et al. | 99/55 |
| 2,490,599 A | 12/1949 | Otting | 99/55 |
| 2,565,085 A | 8/1951 | Peebles | 99/55 |
| 2,570,231 A | 10/1951 | Hansen | 99/55 |
| 2,663,642 A | 12/1953 | Whitaker et al. | 99/55 |
| 2,712,504 A | 7/1955 | Coulter | 99/212 |
| 2,822,277 A | 2/1958 | Ellertson et al. | 99/212 |
| 2,827,381 A | 3/1958 | Boyd | 99/184 |

(Continued)

FOREIGN PATENT DOCUMENTS

FR 1085224 1/1955

(Continued)

OTHER PUBLICATIONS

D. D. Muir, et al., *Production and properties of in-can sterilised concentrated milk with 39% solids: seasonal effects*, Milchwissenschaft 47 (1) 8-11 1992.

(Continued)

*Primary Examiner*—Daniel L Robinson
(74) *Attorney, Agent, or Firm*—Wood, Herron & Evans LLP

(57) ABSTRACT

Liquid beverages containing real milk solids are made from concentrates and water using aseptic dispensers which are maintained at ambient temperature. Hot cappuccino, chocolate and tea beverages containing real milk solids are dispensed using aseptic concentrate containers which maintain stable real milk concentrates for at least 30 days up to about 4-6 months at ambient temperature.

8 Claims, 2 Drawing Sheets

U.S. PATENT DOCUMENTS

| | | |
|---|---|---|
| 2,845,350 A | 7/1958 | Wilcox ............................ 99/55 |
| 2,860,057 A | 11/1958 | Wilcox ........................... 99/212 |
| 2,886,450 A | 5/1959 | Stewart, Jr. et al. ............ 99/200 |
| 3,031,315 A | 4/1962 | Leviton et al. ................. 99/215 |
| 3,065,086 A | 11/1962 | Leviton et al. ................. 99/212 |
| 3,072,491 A | 1/1963 | Leviton et al. ................. 99/212 |
| 3,108,875 A | 10/1963 | Bell ............................... 99/55 |
| 3,119,702 A | 1/1964 | Leviton et al. ................. 99/212 |
| 3,167,437 A | 1/1965 | Leviton et al. ................. 99/212 |
| 4,091,118 A | 5/1978 | de Rham ....................... 426/46 |
| 4,282,262 A | 8/1981 | Blake ............................ 426/565 |
| 4,362,756 A | 12/1982 | Williams ...................... 426/587 |
| 4,651,862 A | 3/1987 | Greenfield, Jr. .............. 194/344 |
| 4,701,329 A | 10/1987 | Nelson et al. ................. 426/74 |
| 4,708,266 A | 11/1987 | Rudick ......................... 222/105 |
| 4,842,884 A | 6/1989 | Bookwalter et al. .......... 426/585 |
| 4,851,250 A | 7/1989 | Bronnert ...................... 426/511 |
| 4,921,717 A * | 5/1990 | Ranjith ........................ 426/587 |
| 5,223,299 A | 6/1993 | Dalan et al. .................. 426/587 |
| 5,229,159 A | 7/1993 | Schwan ....................... 426/587 |
| 5,260,079 A | 11/1993 | Zettier et al. ................ 426/231 |
| 5,353,963 A | 10/1994 | Gorski et al. ............. 222/129.1 |
| 5,544,961 A * | 8/1996 | Fuks et al. ................. 366/163.2 |
| 5,766,666 A | 6/1998 | Streiff et al. ................. 426/587 |
| 6,165,532 A * | 12/2000 | Mutti et al. .................. 426/522 |
| 6,887,505 B2 * | 5/2005 | Reaves et al. ................ 426/115 |
| 2001/0026825 A1 | 10/2001 | Reaves et al. |
| 2002/0017321 A1 | 2/2002 | Schroeder |

FOREIGN PATENT DOCUMENTS

| | | |
|---|---|---|
| FR | 2 835 418 | 8/2003 |
| GB | 1405512 | 9/1975 |
| WO | WO 92/21245 | 12/1992 |

OTHER PUBLICATIONS

Tetra Pak, *Tetra Therm Aseptic VTIS Direct UHT treatment module—based on steam injection*, © 1996 Tetra Pak Processing Systems AB, Lund, Sweden.

U.S. Dept. of Health & Human Services, *Grade "A" Pasteurized Milk Ordinance*, Public Health Service/FDA Publication No. 229, Section 7, pp. 18-19, 1999 Revision.

\* cited by examiner

METHOD AND APPARATUS FOR DISPENSING A LIQUID BEVERAGE CONTAINING REAL MILK SOLIDS

RELATED APPLICATIONS

This application is a continuation-in-part application of U.S. application Ser. No. 10/254,118, filed Sep. 25, 2002, now U.S. Pat. No. 6,887,505 which in turn is a continuation-in-part application of U.S. application Ser. No. 09/850,983, filed May 8, 2001, now abandoned which in turn is a continuation of U.S. application Ser. No. 09/433,365, filed Nov. 3, 1999. now abandoned. The entire disclosures of these applications are incorporated herein by reference.

FIELD OF THE INVENTION

This invention relates to a method and apparatus for dispensing a liquid beverage containing real milk solids by utilizing an aseptic ultra-high temperature (UHT) liquid beverage concentrate for dilution with water and dispensing as a formulated beverage containing real milk solids.

BACKGROUND OF THE INVENTION

The above-identified applications disclose ultra-high temperature pasteurized (UHT) liquid milk concentrates having shelf lives of at least 30 days and, upon dilution with about 3-4 volumes of water, the milk solids do not separate and the diluted concentrate has an acceptable taste profile like fresh milk. It was also disclosed in the above-identified applications that up to about 10% by weight of the UHT milk concentrate may contain a flavor, sweetening agent or a juice concentrate. In these products, the fresh milk taste still dominates the product upon reconstitution with a flavored, sweetened or juice note added to the product. Aseptic packages of both the UHT milk concentrates and flavored or sweetened concentrates were also disclosed for dispensing with a beverage dispenser. The disclosures of these earlier applications are incorporated herein by reference in their entirety.

This application is directed to further improvements in a method and apparatus for dispensing liquid beverages containing real milk solids.

SUMMARY OF THE INVENTION

This invention is directed to a method and apparatus for dispensing a liquid beverage containing real milk solids. A beverage-dispensing container is mounted in a housing under ambient temperature with the container holding an aseptic ultra-high temperature (UHT) liquid beverage concentrate containing real milk solids. The UHT concentrate has an extended shelf stability of at least about 30 days without granulation and/or separation of the milk solids and, upon dilution with water, the milk solids do not separate to provide a drinkable beverage. A portion of the aseptic beverage concentrate is aseptically pumped from the container and mixed with water in preselected proportions to formulate a beverage while maintaining the remaining amount of concentrate in the container under aseptic conditions.

It has been found that beverages such as cappuccino, chocolate, tea, among others, may be ultra-high temperature (UHT) pasteurized containing real milk solids without scorching and separation of the real milk solids. The terms "real milk solids" as used herein mean those proteins, fats, lactose and various vitamins and minerals of milk produced by the mammary glands of mammals, more specifically, the milk of cows or goats, used as food by humans. A stabilizer is used in the concentrate to provide an extended shelf stability of at least about 30 days at ambient temperature, up to 4-6 months, without granulation and/or separation of the solids, even after dilution with water. Aseptic containers of UHT beverage concentrates can be stored under ambient temperature and used to produce a formulated beverage with water containing real milk solids. In dispensing the concentrate and mixing with water, this invention maintains the aseptic qualities of the remaining concentrate in the container so portions of that concentrate may be subsequently dispensed to produce a satisfactory beverage.

Hot liquid beverages are dispensed using the method and apparatus of this invention. For instance, cappuccino, chocolate and tea concentrates containing real milk solids are dispensed with a dispenser where the concentrate container is maintained at ambient temperature of about 60-110° F. The concentrates are mixed with water heated to about 160-210° F for dispensing of the hot liquid beverage at about 150-165° F. Furthermore, beverages containing real milk solids may also be dispensed, for example, at cold or room temperatures, by aseptically pumping the concentrate for mixing with water at ambient temperature. For instance, flavored solids, such as peach, berry, raspberry, caramel, and the like, may also be formulated in a concentrate with real milk solids and dispensed with water to produce flavored beverages.

The advantages and objectives of this invention will be further understood with reference to the following description.

BRIEF DESCRIPTION OF THE DRAWINGS

The objectives and advantages of the present invention will become more apparent by reference to the drawings wherein.

DETAILED DESCRIPTION OF THE INVENTION

Figure 1:
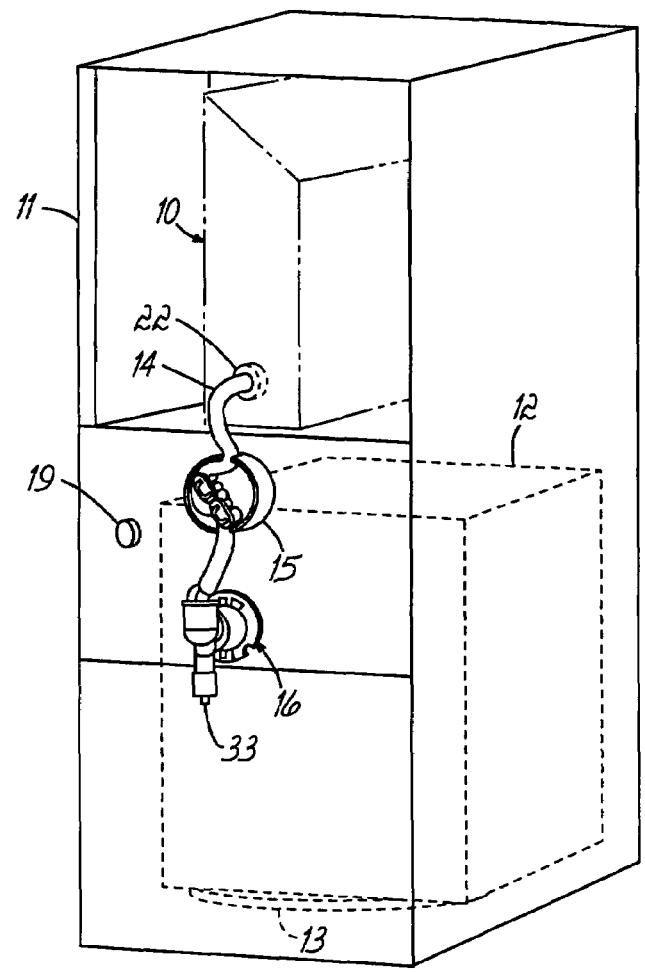
FIG. 1 is a front elevational and perspective view of the beverage dispenser with its front door removed and lower side panel partially removed to show the aseptic concentrate dispensing container, concentrate pump, mixing chamber and water tank.

Aseptic Ultra-High Temperature (UHT) Liquid Beverage Concentrates

The aseptic UHT concentrates that are used to make the beverages according to the method of this invention are made by the steam injection method which has been described in the above identified Related Applications which are incorporated herein by reference in their entireties. Briefly, according to the method, steam is injected directly into the continuous flow of a beverage blend containing real milk solids and a stabilizer to form a pasteurized concentrate which is then aseptically packaged. The aseptic UHT liquid beverage concentrate is stabilized to have (a) an extended shelf stability of at least 30 days up to 4-6 months without granulation and/or separation, (b) milk solids which do not separate upon dilution with water, and (c) upon dilution with water provides a beverage containing real milk solids. More specifically, for example, a Tetra-Pak VTIS direct steam injection system for UHT pasteurization is used in the following examples, as described hereinafter, and the UHT concentrate is aseptically packaged. See Tetra Therm Aseptic VTIS Direct UHT treatment module based on steam injection, ©1996, Tetra Pak Processing Systems AB, Lund, Sweden.

The following are representative aseptic beverage concentrates which are used to make the liquid beverages containing real milk solids.

(A) Cappuccino Concentrate

A cappuccino concentrate for use in the method and dispenser of this invention comprises about 2-12% coffee solids, about 0.5-28% milk solids nonfat (MSNF) and about 0-20% milk fat. A stabilizer in the range of about 0.3 to 1% by weight solids is used, preferably sodium hexametaphosphate (97-99%) and carrageenan, kappa type (1-3%). The cappuccino concentrate is formulated for mixing with water at a ratio of about 3:1 to about 4:1 of water to concentrate to make the beverage. More preferably, when the cappuccino is non-sweetened, it comprises about 5% coffee solids, about 19% MSNF and about 16% milk fat; and the concentrate is mixed at about 4:1 of water to concentrate to make the beverage. Where the cappuccino concentrate is sweetened, it comprises about 2-12% coffee solids, about 0.5-28% MSNF, about 0-20% milk fat and about 5-40% sweetener solids; and the concentrate is mixed at a ratio of about 3:1 of water to concentrate to make the beverage. More preferably, the sweetened cappuccino concentrate comprises about 4% coffee solids, about 11% MSNF, about 8% milk fat and about 30% high fructose corn syrup solids; and the concentrate is mixed at a ratio of about 3:1 of water to concentrate to make the beverage.

(B) Chocolate Concentrate

A chocolate concentrate for use in the method and dispenser of this invention comprises about 0.1-10% chocolate solids, about 0.5-28% milk solids nonfat (MSNF), about 5-40% sweetener solids and about 0-20% milk fat; and the concentrate is mixed at a ratio of about 3:1 to about 4:1 of water to concentrate to make the beverage. The stabilizer is used in same amounts as set forth above in (A). A more preferred chocolate concentrate comprises about 3% chocolate solids, about 8% MSNF, about 35% high fructose corn syrup solids and about 8% milk fat; and the concentrate is mixed at a ratio of about 3:1 of water to concentrate to make the beverage.

(C) Tea Concentrate

A tea concentrate for use in the method and dispenser of this invention comprises about 2-10% tea solids, about 0.5-28% milk solids nonfat (MSNF), about 0-40% sweetener solids, and about 0-20% milk fat; and the concentrate is mixed at a ratio of about 3:1 to about 4:1 of water to concentrate to make the beverage. The stabilizer is used in the same amounts as set forth above in (A). In a more preferred form, the tea concentrate comprises about 2% tea solids, about 12% MSNF, about 28% high fructose corn syrup solids, and about 8% milk fat; and the concentrate is mixed at a ratio of about 3:1 of water to concentrate to make the beverage.

(D) Other Flavored Beverages

Other flavored beverage concentrates are used in the method and dispenser of this invention. Generally, the concentrates comprise about 0.1-10% flavor solids of any one of a wide variety, about 0.5-28% milk solids nonfat (MSNF), about 0-40% sweetener solids, about 0-20% milk fat and about 0.3% to 1% stabilizer as set forth above in (A). The flavor solids for the concentrate are selected, for example, from the group consisting of caramel, vanilla, hazelnut, peach, strawberry, sucralose, aspartame, corn syrup, fructose, and/or fruit/juice concentrate flavor solids selected from the group consisting of peach, orange, strawberry, raspberry, blueberry, grape, and the like.

Method of Making Aseptic UHT Beverage Concentrates

The following examples illustrate specific concentrates which are made for use in the method and dispenser of this invention. In these examples, a stabilizer is first prepared for adding to the beverage concentrate to form a blend that is to be ultra-pasteurized. In these examples, one (1) pound of stabilizer consisting of sodium hexametaphosphate and carrageenan (kappa type) is mixed with two (2) pounds of warm water (70° F. minimum). The resultant mixture is then blended together in a high shear blender for 15 minutes to form a stabilizer slurry, which is then mixed with the initial beverage concentrate for at least 15 minutes to produce the condensed liquid beverage blend containing milk solids that is to be UHT pasteurized. The stabilizer in the examples is a slurry in water of about 1-2% (0.5-1% solids) of the total weight of the blend which includes the beverage solids of cappuccino, chocolate, tea or other beverage flavor as detailed hereinafter. The blend of beverage solids, with stabilizer, real milk solids in condensed liquid milk form, and other ingredients, of the following examples is then continuously run through a Tetra Pak VTIS direct steam injection UHT pasteurization system (Tetra Pak of Sweden, 1996, supra) that uses a pre-warming step of about 180° F. for about 30-36 seconds and then heats the beverage blend to a temperature range of from about 288° F. to about 294° F. for 2.5 to 5 seconds. In these examples, ultrapasteurization temperature is about 294° F. The UHT beverage concentrate is then sent to a cooling condenser which cools the concentrate to a temperature of from about 80° F. to 90° F. within about 2 to 5 seconds. The UHT beverage concentrate is then run through a high-pressure homogenizer, preferably about 3500 to 5000 psi, or as low as 1500 psi, and sent to an aseptic bag filler machine that sterilizes the bag with steam before it is filled with the sterilized UHT beverage concentrate. The nozzle in the inside lip of the bag is sprayed with $H_2O_2$. The final product is checked for proper solids and fat content as well as proper pH level of about 6-8. The beverage concentrates of these examples include solids of from about 40 to 60% when they are running through the direct steam injection system, homogenizer, cooling condenser and sent to the aseptic bag filler.

EXAMPLE 1

| French Vanilla Cappuccino (mix ratio 3.0x) | | |
|---|---|---|
| Ingredients | % by Weight | % Solids |
| Cream (40% solids) | 20.0 | 8 |
| Condensed Skim (40% solids) | 28.0 | 11.3 |
| Stabilizer (0.67% solids mixed with water) | 1.8 | 0.6 |
| Coffee | 7.2 | 4 |
| High Fructose Corn Syrup (HFCS) | 42.5 | 30 |
| Vanilla, Caramel, Hazelnut Flavors | 0.5 | 0.1 |
| Total | 100.00 | 54 |

EXAMPLE 2

Non-Flavored, Non-Sweetened Cappuccino (mix ratio 4.0x)

| Ingredients | % by Weight | % Solids |
|---|---|---|
| Cream (40% solids) | 40.7 | 16.3 |
| Condensed Skim (40% solids) | 47.2 | 18.9 |
| Stabilizer (0.75% solids mixed with water) | 1.5 | 0.5 |
| Coffee | 8.8 | 4.8 |
| High Fructose Corn Syrup (HFCS) | 1.8 | 1.26 |
| Total | 100.00 | 41.76 |

EXAMPLE 3

Chocolate (mix ratio 3.0x)

| Ingredients | % by Weight | % Solids |
|---|---|---|
| Cream (40% solids) | 20 | 8 |
| Condensed Skim (40% solids) | 20.2 | 8 |
| Stabilizer (0.5% solids mixed with water) | 1.6 | 0.5 |
| Cocoa | 3.0 | 3 |
| High Fructose Corn Syrup (HFCS) | 49.7 | 35 |
| Water | 5.5 | |
| Total | 100.00 | 54.5 |

EXAMPLE 4

Vanilla Chi Tea (mix ratio 3.0x)

| Ingredients | % by Weight | % Solids |
|---|---|---|
| Condensed Milk (40% solids) | 26.7 | 10.68 |
| Cream (40% solids) | 20 | 8.00 |
| Stabilizer (0.6% solids mixed with water) | 1.8 | 0.6 |
| Vanilla Chi Concentrate | 3.50 | 2.1 |
| High Fructose Corn Syrup (HFCS) | 48 | 33.58 |
| Total | 100.00 | 54.96 |

EXAMPLE 5

Peach Juice Milk (mix ratio 3:1)

| Ingredients | % by Weight | % Solids |
|---|---|---|
| Condensed Milk (40% solids) | 47.53 | 19.01 |
| Cream (40% solids) | 10.94 | 4.40 |
| Stabilizer (0.41% solids mixed with water) | 1.24 | 0.41 |
| High Fructose Corn Syrup (HFCS) | 29.84 | 20.89 |
| White Grape Concentrate | 10 | 6.56 |

-continued

Peach Juice Milk (mix ratio 3:1)

| Ingredients | % by Weight | % Solids |
|---|---|---|
| Peach Flavor with Color | 0.40 | 0.16 |
| Buffer Salts | 0.05 | 0.02 |
| Total | 100.00 | 51.45 |

EXAMPLE 6

Berry Blue Milk (mix ratio 3:1)

| Ingredients | % by Weight | % Solids |
|---|---|---|
| Condensed Milk (40% solids) | 47.07 | 19.13 |
| Cream (40% solids) | 10.94 | 4.40 |
| Stabilizer (0.6% solids mixed with water) | 1.8 | 0.6 |
| High Fructose Corn Syrup (HFCS) | 39.79 | 27.85 |
| Berry Flavor with Color | 0.40 | 0.16 |
| Total | 100.00 | 52.14 |

EXAMPLE 7

Raspberry Steamer (mix ratio 3:1)

| Ingredients | % by Weight | % Solids |
|---|---|---|
| Condensed Milk (40% solids) | 29.8 | 11.9 |
| Cream (40% solids) | 20 | 8.00 |
| Stabilizer (0.6% solids mixed with water) | 1.8 | 0.6 |
| High Fructose Corn Syrup (HFCS) | 48.08 | 33.65 |
| Raspberry Flavor with Color | 0.32 | 0.16 |
| Total | 100.00 | 54.31 |

EXAMPLE 8

Caramel Steamer (mix ratio 3:1)

| Ingredients | % by Weight | % Solids |
|---|---|---|
| Condensed Milk (40% solids) | 29.8 | 11.9 |
| Cream (40% solids) | 20 | 8.00 |
| Stabilizer (0.6% solids mixed with water) | 1.8 | 0.6 |
| High Fructose Corn Syrup (HFCS) | 48.08 | 33.65 |
| Caramel Flavor with Color | 0.32 | 0.16 |
| Total | 100.00 | 54.31 |

Method and Apparatus for Dispensing the Beverage

Figure 2:
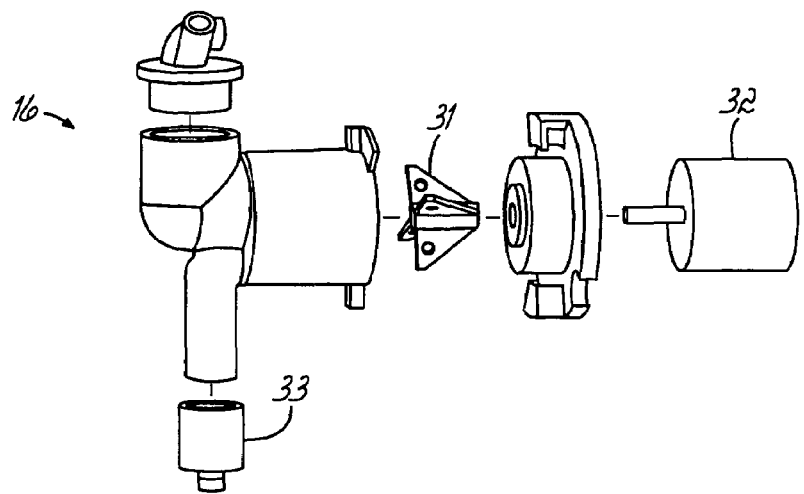
FIG. 2 is an exploded view of the mixing chamber with a whipper blade and dispensing nozzle.
Figure 3:
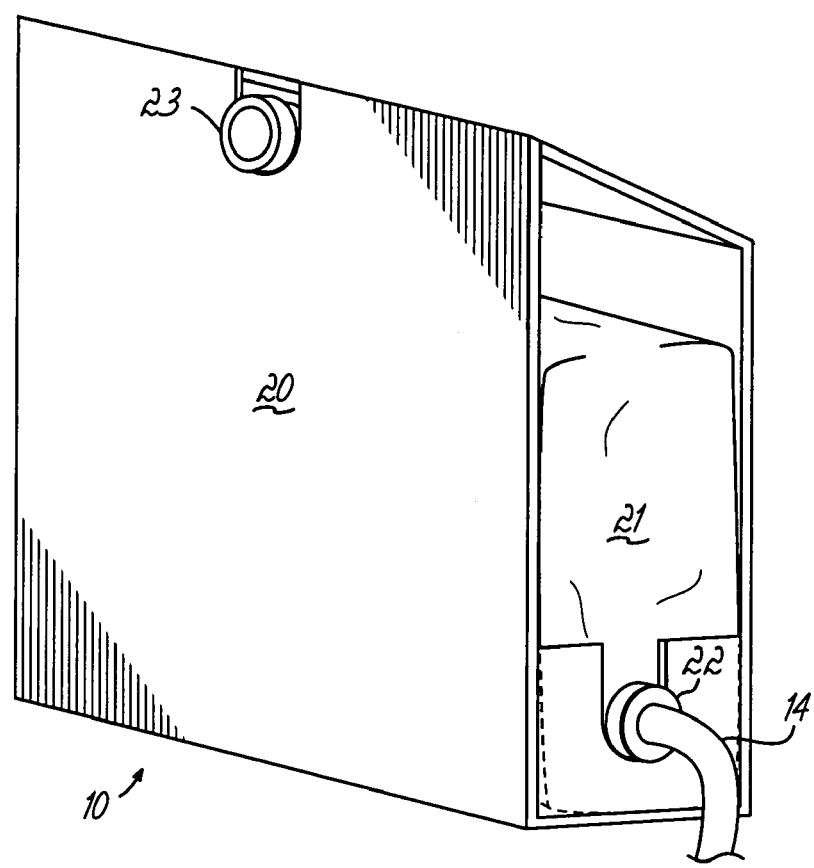
FIG. 3 is a view in perspective of a collapsible bag container for the concentrate as installed in the carrier for mounting in the dispenser housing.

With reference to FIGS. 1-3 of the drawings, the method for dispensing a liquid beverage containing real milk solids is practiced by mounting a removable beverage dispensing container 10 in a housing 11 under ambient temperature. The container holds an aseptic ultra-high temperature (UHT) liquid beverage concentrate (e.g., of Examples 1-8) containing real milk solids and a stabilizer in an effective amount to provide (a) an extended shelf stability of the concentrate of at least about 30 days, usually from about 4-6 months, without granulation and/or separation of the milk solids and (b) milk solids which do not separate upon dilution with water to form the beverage. Accordingly, the aseptic beverage concentrate is maintained at the temperature of a room or the surrounding environment which is usually at an ambient temperature of about 60-110° F. In this arrangement, it is unnecessary to provide a refrigerated environment for the UHT concentrate containing the real milk solids because they have been specially formulated so that the concentrate is stable under such ambient temperature and pressure conditions in its aseptic package.

A water source is positioned in communication with the container 10 for mixing water with the aseptic beverage concentrate. Typically, water is supplied from a domestic or commercial water line to a water tank 12 which has a safety overflow and fill valve, which are not shown but are typically found in water tank assemblies for servicing a reservoir containing water. While the method and apparatus are suitable for dispensing beverages at ambient temperatures, the water tank 12 is provided with a heating coil 13 which operates with suitable voltage to heat the water from about 160 to 210° F. when dispensing a hot liquid beverage from the dispenser at a drinkable temperature of about 150-165° F. While the volume of the water tank 12 may vary in capacity, a typical dispenser would employ a 3.5 gallon water tank which is electronically maintained at a preset desired temperature. The electronics of the dispenser are operated by connection to a 110-440-volt electrical outlet with the standard pressurized continuous flow of potable water from the water pipe.

A critical feature for dispensing the liquid beverage containing real milk solids is to maintain the concentrate under aseptic conditions and aseptically pumping a portion of the concentrate from the container 10 and mixing with water in preselected portions, for example 1:3, to formulate the beverage. To achieve these objectives, in a preferred form, the dispensing container 10 is attached to a conduit 14 which is positioned to operatively engage a pump 15 for aseptically delivering the concentrate portion into a mixing chamber 16 while maintaining the aseptic condition of the concentrate in the container 10. In a preferred form, as shown more clearly in FIG. 2, the dispensing container comprises a carrier 20 for a disposable, collapsible bag 21 and the conduit 14 is a flexible tube. The dispensing container 10 has a discharge port 22 in communication with the conduit 14 for delivery of the concentrate through the flexible tube. A peristaltic pump 15, or a linear wave or other pump, which operatively engages the conduit 14 aseptically delivers the concentrate from the container 10 while maintaining the aseptic condition of the concentrate in the container. The collapsible bag 21 has a filling port 23 and the discharge port 22 which are arranged in the carrier 20 for supporting the container 10 in the housing 11. Other arrangements such as a bag in a box may be substituted for carrier 20 and container 10. With reference to FIG. 2, the carrier 20 and collapsible bag 21 are shown where the filling port 23 of the bag 21 is arranged in a slot of the carrier 20 and the discharge port 22 is also arranged in a slot so that it may operatively engage the pump 15 for aseptically delivering the concentrate into the mixing chamber 16 which is shown more clearly in FIG. 3. It will be understood that the aseptic shelf-stable concentrate is connected to the peristaltic pump for maintaining the aseptic qualities by keeping the containing bag sealed off from the outside atmosphere and becoming contaminated.

A preferred dispenser arrangement for use in the method and apparatus of this invention is shown in U.S. Pat. No. 5,353,963, and the entire disclosure of that patent is incorporated herein by reference. The pump 15 is a 2-roller pump driven by a motor (not shown) which accurately delivers a prescribed portion of the concentrate into the mixing chamber when a run button 19 is pressed while maintaining the remainder of the concentrate in the dispensing bag 21 in an aseptic condition for further use. Water flows by gravity into the mixing chamber 16. The necessary electronics for starting the pump 15, delivering and mixing the concentrate at various ratios, for example, from 1:1 to 4:1 of the water to concentrate is well known in liquid dispensing containers as disclosed in the patent and in dispensers made by Karma, Inc. under the trademark CAFÉ-MATIC™. The flow rate of both the water and the concentrate are electronically measured to produce the desired mix ratio of water and concentrate. The water flow is set at a constant rate of flow and the electronics of the dispenser either speed up or slow down the peristaltic pump 15 to adjust the mix ratio. With reference to FIG. 3, both the hot water and aseptic concentrate are dispensed into a mixing chamber 16 where the two products are mixed together and briefly whipped by a whipper blade 31 driven by a motor 32 at approximately 10,000 rpm to create a rich froth on the finished beverage. The finished beverage then gravity flows into the desired drink container through the dispensing nozzle 33. The mixing chamber 16 is then briefly flushed and sanitized with a short overrun of hot water of about 180-210° F. after the peristaltic pump 15 stops dispensing the concentrate into the mixing chamber 16. The electronics of the dispenser can be arranged to compensate for the brief overrun of extra water and extra concentrate is added by briefly speeding up the peristaltic pump after the run button 19 is released. These features are known in conventional liquid concentrate dispensing machines such as the type disclosed in the above patent and sold by Karma, Inc. The dispenser can be set to flush and sanitize itself by dispensing 180-212° F. water into the mixing chamber for several seconds. This procedure is performed automatically by the dispenser if no product has been dispensed for one hour and will not happen again until another beverage has been dispensed. As indicated above, the hot beverages of the cappuccino, chocolate or tea variety should be at a desired drinking temperature of about 150-165° F. As detailed in the above examples, the mixing ratios are about 3:1 to about 4:1 of water to concentrate.

It will be understood that other beverage dispensers may be adapted to provide a dispenser and perform the method of this invention. Thus, other beverage dispensers, for example manufactured by Wilshire bearing the trademark Quantum 4000™ are operated with a plastic bag package containing the UHT beverage concentrate of this invention to dispense a liquid beverage containing real milk solids. In the dispenser, a peristaltic pump draws the concentrate from the package and discharges it through a dispensing nozzle to mix it with water flowing at a rate effective to reconstitute the concentrate at a mixing ratio of about 3:1 to about 4:1 of water to concentrate to provide the beverages like cappuccino, hot chocolate and tea that contain real milk solids.

While the method and apparatus of this invention have been shown and described in detail, it is obvious that this invention is not considered to be limited to the exact form disclosed and that changes in detail and construction may be made within the scope of the invention without parting from the spirit thereof.

What is claimed is:

1. A method for dispensing a liquid beverage containing real milk solids comprising mounting a beverage dispensing container in a dispenser at ambient temperature and pressure, said container holding an aseptic ultra high temperature (UHT) liquid beverage concentrate containing real milk solids and a stabilizer consisting essentially of sodium hexametaphosphate and carrageenan in an effective amount to provide (a) an extended shelf stability of said concentrate of at least about 30 days without granulation and/or separation of the milk solids, and (b) milk solids which do not separate upon dilution with water, providing a water source for mixing water with said aseptic beverage concentrate in a mixing chamber of the dispenser, aseptically pumping by drawing a portion of said aseptic beverage concentrate from said container and mixing with said water in the dispenser mixing chamber in preselected proportions to formulate said beverage, maintaining the remaining amount of aseptic beverage concentrate in said container under aseptic condition, dispensing said formulated beverage containing real milk solids from said dispenser mixing chamber, and automatically flushing and sanitizing the dispenser by dispensing about 180-212° F. water into the mixing chamber when no product is dispensed for a period of time.

2. The method of claim 1 wherein said concentrate is maintained under ambient temperature and said water is heated to dispense a hot liquid beverage.

3. The method of claim 2 wherein said concentrate is a cappuccino concentrate comprising about 2-12% coffee solids, about 0.5-28% milk solids nonfat (MSNF) and about 0-20% milk fat.

4. The method of claim 3 wherein said cappuccino concentrate is mixed with water at a ratio of about 3:1 to about 4:1 of water to concentrate.

5. The method of claim 2 wherein said concentrate is a cappuccino concentrate comprising about 2-12% coffee solids, about 0.5-28% milk solids nonfat (MSNF), about 0-20% milk fat and about 5-40% sweetener solids and the concentrate is mixed at a ratio of about 3:1 of water to concentrate.

6. The method of claim 2 wherein said concentrate is a chocolate concentrate comprising about 0.1-20% chocolate solids, about 0.5-28% milk solids nonfat (MSNF), about 5-40% sweetener solids and about 0-20% milk fat and the concentrate is mixed at a ratio of about 3:1 to about 4:1 of water to concentrate.

7. The method of claim 2 wherein said concentrate is a tea concentrate comprising about 2-10% tea solids, about 0.5-28% milk solids nonfat (MSNF), about 0-40% sweetener solids and about 0-20% milk fat and the concentrate is mixed at a ratio of about 3:1 to about 4:1 of water to concentrate.

8. The method of claim 1 wherein the concentrate comprises about 0.1-10% flavor solids, about 0.5-28% milk solids nonfat (MSNF), about 0-40% sweetener solids, and about 0-20% milk fat.

* * * * *